United States Patent
Kim

(10) Patent No.: US 11,235,498 B2
(45) Date of Patent: Feb. 1, 2022

(54) MANUFACTURING METHOD OF METAL-POLYMER RESIN BONDED COMPONENT

(71) Applicant: PLASTAL CO., LTD., Incheon (KR)

(72) Inventor: Jae Ho Kim, Incheon (KR)

(73) Assignee: PLASTAL CO., LTD., Incheon (KR)

(*) Notice: Subject to any disclaimer, the term of this patent is extended or adjusted under 35 U.S.C. 154(b) by 72 days.

(21) Appl. No.: 16/636,387

(22) PCT Filed: Aug. 21, 2018

(86) PCT No.: PCT/KR2018/009591
§ 371 (c)(1),
(2) Date: Feb. 4, 2020

(87) PCT Pub. No.: WO2019/039831
PCT Pub. Date: Feb. 28, 2019

(65) Prior Publication Data
US 2020/0171722 A1    Jun. 4, 2020

(30) Foreign Application Priority Data
Aug. 25, 2017  (KR) .................. 10-2017-0108019

(51) Int. Cl.
*B29C 45/14*    (2006.01)
*C23F 1/16*    (2006.01)
(Continued)

(52) U.S. Cl.
CPC .......... *B29C 45/14336* (2013.01); *C23F 1/16* (2013.01); *C23F 1/32* (2013.01);
(Continued)

(58) Field of Classification Search
CPC ...... H05K 5/00–069; C25D 11/04–246; B29C 45/14336; B29C 2045/14868; B32B 15/08–098; B32B 27/00–42; C23F 1/36
See application file for complete search history.

(56) References Cited

U.S. PATENT DOCUMENTS 3,935,349 A * 1/1976 Terai .................. B05D 7/14
427/409
2010/0119837 A1* 5/2010 Vreugdenhil ........ C09D 183/06
428/418
(Continued)

FOREIGN PATENT DOCUMENTS

CN    105128260 A * 12/2015
EP    0926266 B1 * 10/2002 ........... C23F 1/04
(Continued)

OTHER PUBLICATIONS

Deguchi et al., Machine Translation, JP 2013052671 A (Year: 2013).*
(Continued)

*Primary Examiner* — Ho-Sung Chung

(57) ABSTRACT

The present invention relates to a method of manufacturing a metal-polymer resin bonded body, including: degreasing metal using a degreasing solution; etching the metal using an etching solution; electrolyzing the metal using an electrolyte solution; and performing a polymer resin injection to bond a polymer resin to the metal, wherein the electrolyte solution includes a compound containing distilled water, oxalic acid, sulfuric acid, and carboxylic acid.

14 Claims, 1 Drawing Sheet

(51) Int. Cl.
- C23F 1/32 (2006.01)
- C23G 1/14 (2006.01)
- C25D 11/10 (2006.01)
- C25D 11/18 (2006.01)
- C25D 11/16 (2006.01)
- B29K 705/00 (2006.01)

(52) U.S. Cl.
  CPC ............... C23G 1/14 (2013.01); C25D 11/10 (2013.01); C25D 11/16 (2013.01); C25D 11/18 (2013.01); B29C 2045/14868 (2013.01); B29K 2705/00 (2013.01)

(56) References Cited

U.S. PATENT DOCUMENTS

| | | | | |
|---|---|---|---|---|
| 2015/0251345 | A1* | 9/2015 | Zhang | B32B 27/20 264/265 |
| 2016/0067894 | A1* | 3/2016 | Lee | C23F 1/20 216/103 |
| 2016/0160371 | A1* | 6/2016 | Chang | C25D 11/24 205/50 |

FOREIGN PATENT DOCUMENTS

| | | | |
|---|---|---|---|
| JP | 2005-179730 | 7/2005 | |
| JP | 2013052671 A * | 3/2013 | ....... B29C 45/14311 |
| KR | 2009-0027317 | 3/2009 | |
| KR | 2012-0021616 | 3/2012 | |
| KR | 101573913 B1 * | 12/2015 | |
| KR | 10-1592147 | 2/2016 | |
| KR | 10-1606567 | 3/2016 | |
| WO | WO-2012131704 A2 * | 10/2012 | ............. C25D 11/24 |

OTHER PUBLICATIONS

Jeon et al., Machine Translation, KR 10-1573913 B1 (Year: 2015).*
Random House, Webster's Unabridged Dictionary (Year: 2001).*
Li et al., Machine Translation, CN 105128260 A (Year: 2015).*
International Search Report dated Nov. 26, 2018 for PCT/KR2018/009591.

* cited by examiner

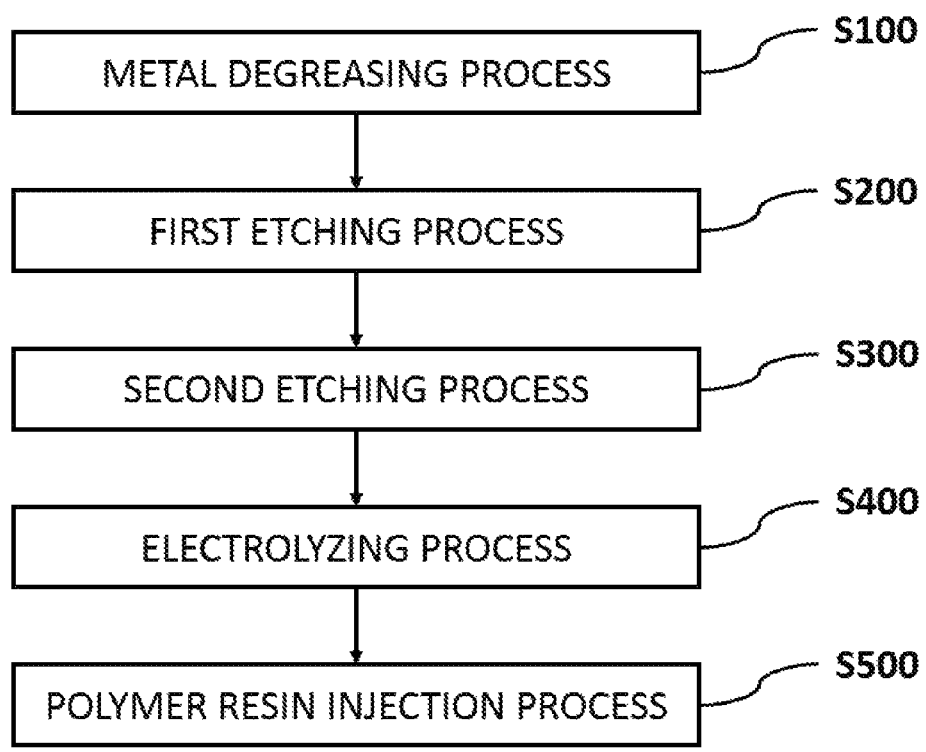

MANUFACTURING METHOD OF METAL-POLYMER RESIN BONDED COMPONENT

This application claims the priority of Korean Patent Application No. 10-2017-0108019, filed on Aug. 25, 2017 in the KIPO (Korean Intellectual Property Office), the disclosure of which is incorporated herein entirely by reference. Further, this application is the National Stage application of International Application No. PCT/KR2018/009591, filed Aug. 21, 2018, which designates the United States and was published in Korean. Each of these applications is hereby incorporated by reference in their entirety into the present application.

TECHNICAL FIELD

The following description relates to a method of manufacturing a metal-polymer resin bonded body, and more particularly, to a method of manufacturing a metal-polymer resin bonded body which can improves adhesion between a metal and a polymer resin.

BACKGROUND ART

A metal-polymer resin bonded body in which a metal member, such as aluminum, iron (Fe) or the like, and a plastic member formed of a polymer resin are rigidly bonded and integrated together can be used in many fields of industry. Such a metal-polymer resin body has been applied to an aircraft part, a housing of secondary batteries, and the like, and recently, widely applied to an exterior material of smartphones.

The metal-polymer resin bonded body is generally manufactured by bonding a metal and a plastic member formed of a polymer resin with an adhesive, or by performing insert injection molding while inserting the metal into a mold.

However, generally, the existing manufacturing methods have a problem in that a sufficient adhesion force between the metal and the polymer resin is not ensured, and thus there is a growing need to develop a technique for securing sufficient adhesion between a metal and a polymer resin in a metal-polymer resin bonded body.

DISCLOSURE OF THE INVENTION

Technical Problem

The following description relates to a method of manufacturing a metal-polymer resin bonded body which can improve adhesion between a metal and a polymer resin.

Technical Solution

In one general aspect, there is provided a method of manufacturing a metal-polymer resin bonded body, including: degreasing metal using a degreasing solution; etching the metal using an etching solution; electrolyzing the metal using an electrolyte solution; and performing a polymer resin injection to bond a polymer resin to the metal, wherein the electrolyte solution includes a compound containing distilled water, oxalic acid, sulfuric acid, and carboxylic acid.

The compound containing carboxylic acid may contain at least one of imidazole-5-carboxylic acid, 1,2,3-thiadiazole carboxylic acid, cyclohexane polycarboxylic acid, heteroaryl carboxylic acid, amino carboxylic acid, benzene polycarboxylic acid, benzoindole carboxylic acid, hydroxycarboxylic acid, pyrazolecarboxylic acid, quinolinecarboxylic acid, polyfluorocarboxylic acid, isothiazole carboxylic acid, pyridonecarboxylic acid, aminothiophenecarboxylic acid, benzophenonetetracarboxylic acid, 3-carbamoylpyrazine-2-carboxylic acid, 3-carboxy-1-adamantaneacetic acid, naphthaleneacetic acid, tetraacetic acid, indole acetic acid, and catechol-O,O-diacetic acid.

The electrolyte solution may contain 0.5 to 5 parts by weight of oxalic acid, 0.1 to 10 parts by weight of compound containing carboxylic acid, and 5 to 50 parts by weight of sulfuric acid based on 100 parts by weight of distilled water.

The electrolyzing of the metal may be performed for 180 to 1800 seconds at a temperature of 5 to 60° C.

The etching of the metal may include a first etching process for etching the metal using a first etching solution and a second etching process for etching the metal using a second etching solution.

The first etching solution may contain at least one of oxalic acid, acetic acid, nitric acid, hydrochloric acid, and hydrogen peroxide, and distilled water, and the second etching solution may contain sodium hydrogen carbonate, sodium hydroxide, sodium tetraborate, and distilled water.

The second etching solution may contain 0.5 to 8 parts by weight of sodium hydrogen carbonate, 5 to 20 parts by weight of sodium hydroxide, and 0.5 to 8 parts by weight of sodium tetraborate based on 100 parts by weight of distilled water.

Each of the first etching process and the second etching process may be performed for 30 to 300 seconds at a temperature of 30 to 80° C.

The degreasing of the metal may be performed together with ultrasonic treatment and the degreasing solution may contain distilled water and one of sodium hydrogen carbonate and sodium hexameta phosphate.

The metal may be one of aluminum, iron, copper, gold, and silver, and the polymer resin may include at least one of polybutylene terephthalate (PBT), polyphenylene sulfide (PPS), polyphthalamides (PPA), polyethylene terephthalate (PET), polycarbonate (PC), polyimide (PI), polyaryletherketone (PAEK), polyether-ether-ketone (PEEK).

Advantageous Effects

According to the embodiments of the present disclosure, it improves adhesion between a metal and a polymer resin.

BRIEF DESCRIPTION OF THE DRAWINGS

FIG. 1 is a flowchart illustrating a method of manufacturing a metal-polymer resin bonded body according to one embodiment of the present invention.

BEST MODE FOR CARRYING OUT THE INVENTION

Hereinafter, the present invention will be described in detail with reference exemplary embodiments thereof. It will become obvious to a person having ordinary skill in the art that these exemplary embodiments are merely provided to describe the present invention in further detail and are not intended to limit the scope of the present invention.

Unless specifically defined otherwise, all the technical and scientific terms used in this specification have the same meanings as what are generally understood by a person skilled in the related art to which the present invention belongs. In general, the nomenclature used in this specification and the experimental methods described below is widely known and generally used in the related art. In the case of conflict, priority will be given to the definitions included in this specification. Also, although similar or equivalent methods and materials to those disclosed in this specification may be used to put the present invention into practice or used for experiments, suitable methods and materials are disclosed in this specification.

Hereinafter, a method of manufacturing a metal-polymer resin bonded body according to one embodiment of the present invention will be described in detail with reference to FIG. 1.

FIG. 1 is a flowchart illustrating a method of manufacturing a metal-polymer resin bonded body according to one embodiment of the present invention.

The method of manufacturing a metal-polymer resin bonded body according to one embodiment of the present invention includes a metal degreasing process S100, a first etching process S200, a second etching process S300, an electrolyzing process S400, and a polymer resin injection process S500.

Hereinafter, each process will be described in detail.

First, the metal degreasing process S100 is performed.

A metal according to one embodiment of the present invention may include aluminum Al, but is not limited thereto, and may include various metals, such as iron, copper, gold, silver, and the like.

The metal degreasing process S100 may be performed using a degreasing solution together with ultrasonic treatment on a surface of the metal, and is a process of removing contaminants, such as oil, which are present on the surface of the metal by applying the degreasing solution together with the ultrasonic treatment on the metal surface.

The ultrasonic treatment may be performed using an ultrasonic cleaner, and the application of the degreasing solution may be performed by immersing the metal in the degreasing solution while agitating the degreasing solution.

The degreasing solution according to one embodiment of the present invention may include one of sodium hydrogen carbonate ($NaHCO_3$) and sodium hexameta phosphate ($(NaPO_3)_6$) and distilled water, and the metal degreasing process S100 may be performed for 30 to 300 seconds at a temperature of 30 to 80° C.

The degreasing solution may contain 0.5 to 10 parts by weight of sodium hydrogen carbonate and 0.5 to 10 parts by weight of sodium hexameta phosphate based on 100 parts by weight of distilled water.

This is because the use of the degreasing solution with the above contents at the above-described temperature for the above-described time period achieves an excellent effect of removing residue of molding oil.

Thereafter, etching processes S200 and S300 of the degreased metal is performed.

According to one embodiment of the present invention, two etching processes, i.e., a first etching process S200 and a second etching process S300 may be performed on the metal.

The first etching process S200 may be performed on the surface of the metal using a first etching solution and is a process for forming primary pores on the metal surface.

The first etching process S200 may be performed by immersing the metal in the first etching solution while agitating the first etching solution.

The first etching solution according to one embodiment of the present invention may include at least one of oxalic acid ($C_2H_2O_4$), acetic acid ($CH_3COOH$), nitric acid ($HNO_3$), hydrochloric acid (HCl), and hydrogen peroxide ($H_2O_2$) and distilled water.

The first etching solution may contain 0.5 to 5 parts by weight of oxalic acid, 0.1 to 5 parts by weight of acetic acid, 5 to 40 parts by weight of nitric acid, 5 to 40 parts by weight of hydrochloric acid, 0.5 to 5 parts by weight of hydrogen peroxide based on 100 parts by weight of distilled water.

When the first etching solution with the above contents is used, uniform primary pores may be formed on the metal surface.

The second etching process S300 following the first etching process S200 may be performed on the surface of the metal using a second etching solution, and is a process for forming secondary pores that are finer than the primary pores on the metal surface on which the primary pores have been formed through the first etching process S200.

Although not illustrated in the drawing, before the second etching process S300 is performed, a process for cleaning the residual contaminants on the metal surface that occurred in the first etching process S200 may be performed after the first etching process S200 when necessary.

The second etching process S300 may be performed by immersing the metal while agitating the second etching solution.

The second etching solution according to one embodiment of the present invention may include sodium hydrogen carbonate ($NaHCO_3$), sodium hydroxide (NaOH), sodium tetraborate ($Na_2B_4O_7$), and distilled water.

The second etching solution may contain 0.5 to 8 parts by weight of sodium hydrogen carbonate, 5 to 20 parts by weight of sodium hydroxide, and 0.5 to 8 parts by weight of sodium tetraborate based on 100 parts by weight of distilled water.

When the second etching solution with the above contents is used, the uniform secondary pores may be formed on the metal surface.

The first etching process S200 and the second etching process S300 may each be performed for 30 to 300 seconds at a temperature of 30 to 80° C.

This is because uniform pores are formed when the etching of the metal is performed for the time period at the temperature as described above, and thereby the bonding strength to a polymer resin can be maximized.

Then, the electrolyzing process S400 is performed on the metal subjected to the etching processes S200 and S300.

Although not illustrated in the drawing, before the electrolyzing process S400 is performed, a metal surface activation process using a nitric acid ($HNO_3$) solution for maximizing the process efficiency of the electrolyzing process S400 may be further preformed after the etching processes S200 and S300 when necessary.

The metal electrolyzing process S400 may be performed on the surface of the metal using an electrolyte solution, and is a process for forming a coating layer including fine projections on the surface of the metal on which the pores have been formed.

In the electrolysis process S400, electrolysis may be performed in the electrolyte solution using the metal as an anode and an insoluble electrode as a cathode. In this case, platinum, stainless steel, carbon or the like may be used as the cathode.

The electrolyte solution according to one embodiment of the present invention may include a compound containing oxalic acid ($C_2H_2O_4$), sulfuric acid ($H_2SO_4$), and carboxylic acid ($CO_2H$), and distilled water.

Here, the compound containing carboxylic acid may contain at least one of imidazole-5-carboxylic acid, 1,2,3-thiadiazole carboxylic acid, cyclohexane polycarboxylic acid, heteroaryl carboxylic acid, amino carboxylic acid, benzene polycarboxylic acid, benzoindole carboxylic acid, hydroxycarboxylic acid, pyrazolecarboxylic acid, quinolinecarboxylic acid, polyfluorocarboxylic acid, isothiazole carboxylic acid, pyridonecarboxylic acid, aminothiophenecarboxylic acid, benzophenonetetracarboxylic acid, 3-carbamoylpyrazine-2-carboxylic acid, 3-carboxy-1-adamantaneacetic acid, naphthaleneacetic acid, tetraacetic acid, indole acetic acid, and catechol-O,O-diacetic acid.

The electrolyte solution may contain 0.5 to 5 parts by weight of oxalic acid, 0.1 to 10 parts by weight of compound containing carboxylic acid, and 5 to 50 parts by weight of sulfuric acid based on 100 parts by weight of distilled water.

The electrolyzing process S400 may be performed for 180 to 1800 seconds at a temperature of 5 to 60° C.

In addition, in the electrolyzing process S400, an electrolytic current density may be 0.1 to 5 A/dm2.

This is because uniform fine projections are formed when the electrolysis of the metal is performed at the current density for the time period at the temperature as described above, and thereby the bonding strength to the polymer resin can be maximized.

Then, the polymer resin injection process S500 is performed on the metal subjected to the electrolyzing process S400.

Although not illustrated in the drawing, after the electrolyzing process S400, a drying process using hot air or the like may be further performed to remove moisture from the metal surface and prevent corrosion of the metal surface, before the polymer resin injection process S500 is performed.

As the polymer resin, polybutylene terephthalate (PBT), polyphenylene sulfide (PPS), polyphthalamides (PPA), polyethylene terephthalate (PET), polycarbonate (PC), polyimide (PI), polyaryletherketone (PAEK), polyether-etherketone (PEEK), or the like may be used, but the embodiment of the present invention is not limited thereto and various polymer resins may be applied.

In the polymer resin injection process S500, the metal is placed in a mold and the polymer resin in a molten state is injected into the mold and then cured to prepare a metal-polymer resin bonded body.

Hereinafter, the structure and effects of the present invention will be described in more detail with reference to examples and comparative examples. However, the examples are provided to describe the present invention in more detail, and the scope of the present invention is not limited to the examples.

Example 1

Aluminum alloy (AL6063), as a metal material, of 12 mm in width, 40 mm in length, and 3 mm in height was immersed into a decreasing solution being agitated and containing 3.5 parts by weight of sodium hydrogen carbonate and 2.5 parts by weight of sodium hexameta phosphate based on 100 parts by weight of distilled water for 30 seconds at a temperature of 30° C. and was simultaneously subjected to ultrasonic treatment, so that a degreasing process was performed. The degreased aluminum alloy was immersed into a first etching solution being agitated and containing 3.5 parts by weight of oxalic acid, 1.5 parts by weight of acetic acid, 30 parts by weight of nitric acid, 35 parts by weight of hydrochloric acid, and 3.5 parts by weight of hydrogen peroxide based on 100 parts by weight of distilled water for 300 seconds at a temperature of 70° C., so that a first etching process was performed. Thereafter, the aluminum alloy was immersed into a second etching solution being agitated and containing 8 parts by weight of sodium hydrogen carbonate, 15 parts by weight of sodium hydroxide, and 6 parts by weight of sodium tetraborate based on 100 parts by weight of distilled water for 30 seconds at a temperature of 70° C., so that a second etching process was performed. Then, the aluminum alloy subjected to the etching process was subjected to electrolysis using an electrolyte solution containing 3.5 parts by weight of oxalic acid, 6 parts by weight of 3-Carboxy-1-adamantaneacetic Acid, and 40 parts by weight of sulfuric acid based on 100 parts by weight of distilled water at a current density of 3.5 A/dm2 for 1200 seconds at a temperature of 20° C. A polyphenylene sulfide (PPS, Toray Industries, Inc.) of the same size as the aluminum alloy was bonded to a side of the aluminum alloy, which had been subjected to the degreasing, etching, and the electrolyzing processes, by using a multi-injection machine (TB series 120-ton horizontal injection machine, Woojin Plaimm INC.) and then cured to prepare a metal-polymer resin bonded body.

Example 2

A metal-polymer resin bonded body was prepared in the same manner as Example 1 except that imidazole-5-carboxylic acid was used instead of 3-Carboxy-1-adamantaneacetic Acid in the electrolyte solution.

Example 3

A metal-polymer resin bonded body was prepared in the same manner as Example 1 except that 1,2,3-thiadiazole carboxylic acid was used instead of 3-Carboxy-1-adamantaneacetic Acid in the electrolyte solution.

Example 4

A metal-polymer resin bonded body was prepared in the same manner as Example 1 except that cyclohexane polycarboxylic acid was used instead of 3-Carboxy-1-adamantaneacetic Acid in the electrolyte solution.

Example 5

A metal-polymer resin bonded body was prepared in the same manner as Example 1 except that heteroaryl carboxylic acid was used instead of 3-Carboxy-1-adamantaneacetic Acid in the electrolyte solution.

Example 6

A metal-polymer resin bonded body was prepared in the same manner as Example 1 except that amino carboxylic acid was used instead of 3-Carboxy-1-adamantaneacetic Acid in the electrolyte solution.

Example 7

A metal-polymer resin bonded body was prepared in the same manner as Example 1 except that benzene polycarboxylic acid was used instead of 3-Carboxy-1-adamantaneacetic Acid in the electrolyte solution.

Example 8

A metal-polymer resin bonded body was prepared in the same manner as Example 1 except that benzoindole carboxylic acid was used instead of 3-Carboxy-1-adamantaneacetic Acid in the electrolyte solution.

Example 9

A metal-polymer resin bonded body was prepared in the same manner as Example 1 except that hydroxycarboxylic acid was used instead of 3-Carboxy-1-adamantaneacetic Acid in the electrolyte solution.

Example 10

A metal-polymer resin bonded body was prepared in the same manner as Example 1 except that pyrazolecarboxylic acid was used instead of 3-Carboxy-1-adamantaneacetic Acid in the electrolyte solution.

Example 11

A metal-polymer resin bonded body was prepared in the same manner as Example 1 except that quinolinecarboxylic acid was used instead of 3-Carboxy-1-adamantaneacetic Acid in the electrolyte solution.

Example 12

A metal-polymer resin bonded body was prepared in the same manner as Example 1 except that polyfluorocarboxylic acid was used instead of 3-Carboxy-1-adamantaneacetic Acid in the electrolyte solution.

Example 13

A metal-polymer resin bonded body was prepared in the same manner as Example 1 except that isothiazole carboxylic acid was used instead of 3-Carboxy-1-adamantaneacetic Acid in the electrolyte solution.

Example 14

A metal-polymer resin bonded body was prepared in the same manner as Example 1 except that pyridonecarboxylic acid was used instead of 3-Carboxy-1-adamantaneacetic Acid in the electrolyte solution.

Example 15

A metal-polymer resin bonded body was prepared in the same manner as Example except that aminothiophenecarboxylic acid was used instead of 3-Carboxy-1-adamantaneacetic Acid in the electrolyte solution.

Example 16

A metal-polymer resin bonded body was prepared in the same manner as Example 1 except that benzophenonetetracarboxylic acid was used instead of 3-Carboxy-1-adamantaneacetic Acid in the electrolyte solution.

Example 17

A metal-polymer resin bonded body was prepared in the same manner as Example 1 except that 3-carbamoylpyrazine-2-carboxylic acid was used instead of 3-Carboxy-1-adamantaneacetic acid in the electrolyte solution.

Example 18

A metal-polymer resin bonded body was prepared in the same manner as Example 1 except that naphthaleneacetic acid was used instead of 3-Carboxy-1-adamantaneacetic Acid in the electrolyte solution.

Example 19

A metal-polymer resin bonded body was prepared in the same manner as Example 1 except that tetraacetic acid was used instead of 3-Carboxy-1-adamantaneacetic Acid in the electrolyte solution.

Example 20

A metal-polymer resin bonded body was prepared in the same manner as Example 1 except that indole acetic acid was used instead of 3-Carboxy-1-adamantaneacetic Acid in the electrolyte solution.

Example 21

A metal-polymer resin bonded body was prepared in the same manner as Example 1 except that catechol-O,O-diacetic acid was used instead of 3-Carboxy-1-adamantaneacetic Acid in the electrolyte solution.

Example 22

A metal-polymer resin bonded body was prepared in the same manner as Example 1 except that a second etching solution containing 8 parts by weight of sodium hydrogen carbonate, 20 parts by weight of sodium hydroxide, and 8 parts by weight of sodium tetraborate based on 100 parts by weight of distilled water was used in the second etching process.

Example 23

A metal-polymer resin bonded body was prepared in the same manner as Example 1 except that a second etching solution containing 0.5 parts by weight of sodium hydrogen carbonate, 5 parts by weight of sodium hydroxide, and 0.5 parts by weight of sodium tetraborate based on 100 parts by weight of distilled water was used in the second etching process.

Example 24

A metal-polymer resin bonded body was prepared in the same manner as Example 1 except that an electrolyte solution containing 5 parts by weight of oxalic acid, 10 parts by weight of 3-Carboxy-1-adamantaneacetic Acid, and 50 parts by weight of sulfuric acid based on 100 parts by weight of distilled water was used in the electrolyzing process.

Example 25

A metal-polymer resin bonded body was prepared in the same manner as Example 1 except that an electrolyte solution containing 0.5 parts by weight of oxalic acid, 0.1 parts by weight of 3-Carboxy-1-adamantaneacetic Acid, and 5 parts by weight of sulfuric acid based on 100 parts by weight of distilled water was used in the electrolyzing process.

Comparative Example 1

A metal-polymer resin bonded body was prepared in the same manner as Example 1 except that only sulfuric acid was included in the electrolyte solution in the electrolyzing process.

Comparative Example 2

A metal-polymer resin bonded body was prepared in the same manner as Example 1 except that only sulfuric acid and oxalic acid were included in the electrolyte solution in the electrolyzing process.

Comparative Example 3

A metal-polymer resin bonded body was prepared in the same manner as Example 1 except that the second etching process was omitted.

Comparative Example 4

A metal-polymer resin bonded body was prepared in the same manner as Example 1 except that the first etching process was omitted.

Comparative Example 5

A metal-polymer resin bonded body was prepared in the same manner as Example 1 except that only nitric acid was included in a second etching solution in the second etching process.

Comparative Example 6

A metal-polymer resin bonded body was prepared in the same manner as Example 1 except that the first etching process and the second etching process were each performed for 10 seconds.

Comparative Example 7

A metal-polymer resin bonded body was prepared in the same manner as Example 1 except that the first etching process and the second etching process were each performed for 20 seconds.

Comparative Example 8

A metal-polymer resin bonded body was prepared in the same manner as Example 1 except that the first etching process and the second etching process were each performed for 310 seconds.

Comparative Example 9

A metal-polymer resin bonded body was prepared in the same manner as Example 1 except that the first etching process and the second etching process were each performed for 320 seconds.

Comparative Example 10

A metal-polymer resin bonded body was prepared in the same manner as Example 1 except that the first etching process and the second etching process were performed at a temperature of 10° C.

Comparative Example 11

A metal-polymer resin bonded body was prepared in the same manner as Example 1 except that the first etching process and the second etching process were performed at a temperature of 20° C.

Comparative Example 12

A metal-polymer resin bonded body was prepared in the same manner as Example 1 except that the first etching process and the second etching process were performed at a temperature of 90° C.

Comparative Example 13

A metal-polymer resin bonded body was prepared in the same manner as Example 1 except that the first etching process and the second etching process were performed at a temperature of 100° C.

Experimental Example (1) Tensile Strength Measurement

By using a tensile tester (UTM, TIME Group Inc.) to examine the adhesion between an aluminum alloy and a cured polymer resin, the tensile strength at the point when the aluminum alloy and the polymer resin were separated at 3 mm/min was measured. The tensile strength was calculated as an average obtained by repeating the same experiment 10 times.

(2) Helium Leakage Amount Measurement

In order to examine the uniformity of adhesion between the aluminum alloy and the cured polymer resin, the leakage amount of helium on the adhesion surface of the aluminum alloy and the polymer resin was measured using a helium leakage measuring device. In this case, O is indicated when the helium leakage amount was $10^{-8}$ Pa·m³/s or less, and X is indicated when the helium leakage amount exceeded $10^{-8}$ Pa·m³/s.

The experiment results are shown in Table 1 below.

TABLE 1

| | Tensile strength (MPa) | Helium Leakage Amount |
|---|---|---|
| Example 1 | 43.4 | O |
| Example 2 | 43.5 | O |
| Example 3 | 43.2 | O |
| Example 4 | 42.9 | O |
| Example 5 | 43.9 | O |
| Example 6 | 44.0 | O |
| Example 7 | 43.4 | O |
| Example 8 | 43.5 | O |
| Example 9 | 43.1 | O |
| Example 10 | 44.0 | O |
| Example 11 | 43.8 | O |
| Example 12 | 43.6 | O |
| Example 13 | 43.2 | O |
| Example 14 | 43.7 | O |
| Example 15 | 43.8 | O |
| Example 16 | 44.1 | O |
| Example 17 | 43.8 | O |
| Example 18 | 42.9 | O |
| Example 19 | 43.2 | O |
| Example 20 | 43.1 | O |
| Example 21 | 43.4 | O |
| Example 22 | 43.4 | O |
| Example 23 | 43.5 | O |
| Example 24 | 42.9 | O |
| Example 25 | 43.8 | O |

TABLE 1-continued

| | Tensile strength (MPa) | Helium Leakage Amount |
|---|---|---|
| Comparative Example 1 | 38.5 | X |
| Comparative Example 2 | 41.3 | X |
| Comparative Example 3 | 36.7 | X |
| Comparative Example 4 | 40.8 | X |
| Comparative Example 5 | 40.2 | X |
| Comparative Example 6 | 25.0 | X |
| Comparative Example 7 | 31.6 | X |
| Comparative Example 8 | 33.8 | X |
| Comparative Example 9 | 29.7 | X |
| Comparative Example 10 | 9.7 | X |
| Comparative Example 11 | 30.2 | X |
| Comparative Example 12 | 37.0 | X |
| Comparative Example 13 | 20.2 | X |

As shown in Table 1, the metal-polymer resin bonded bodies prepared according to Comparative Examples 1 and 2 in which the electrolyte solution contained sulfuric acid only or contained sulfuric acid and oxalic acid only, Comparative Examples 3 and 4 in which one of the two etching processes was omitted, Comparative Example 5 in which a nitric acid solution was used as the second etching solution, Comparative Examples 6 to 9 in which each of the two etching processes was performed for less than 30 seconds or longer than 300 seconds, and Comparative Examples 10 to 13 in which the two etching processes were performed at a temperature of less than 30° C. or more than 80° C. exhibit lower tensile strengths than those of the metal-polymer resin bonded bodies according to the examples, and the helium leakage amount exceeded $10^{-8}$ Pa·m$^3$/s, so that the uniformity of adhesion was also inferior. As described above, according to the method of manufacturing a metal-polymer resin bonded body in accordance with one embodiment of the present invention, it is possible to improve the adhesion between a metal and a polymer resin.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of manufacturing a metal-polymer resin bonded body, comprising:
degreasing metal using a degreasing solution;
etching the metal using an etching solution, the etching comprising:
forming uniform primary pores on the metal surface by a first etching process using a first acidic etching solution; and
forming secondary pores finer than the primary pores on the metal surface by a second etching process using a second basic etching solution;
electrolyzing the metal using an electrolyte solution; and
performing a polymer resin injection to bond a polymer resin to the metal,
wherein the electrolyte solution includes a compound containing distilled water, oxalic acid, sulfuric acid, and carboxylic acid.

2. The method of claim 1, wherein the compound containing carboxylic acid contains at least one of imidazole-5-carboxylic acid, 1,2,3-thiadiazole carboxylic acid, cyclohexane polycarboxylic acid, heteroaryl carboxylic acid, amino carboxylic acid, benzene polycarboxylic acid, benzoindole carboxylic acid, hydroxycarboxylic acid, pyrazolecarboxylic acid, quinolinecarboxylic acid, polyfluorocarboxylic acid, isothiazole carboxylic acid, pyridonecarboxylic acid, aminothiophenecarboxylic acid, benzophenonetetracarboxylic acid, 3-carbamoylpyrazine-2-carboxylic, 3-carboxy-1-adamantaneacetic acid, naphthaleneacetic acid, tetraacetic acid, indole acetic acid, and catechol-O,O-diacetic acid.

3. The method of claim 2, wherein the electrolyte solution contains 0.5 to 5 parts by weight of oxalic acid, 0.1 to 10 parts by weight of compound containing carboxylic acid, and 5 to 50 parts by weight of sulfuric acid based on 100 parts by weight of distilled water.

4. The method of claim 3, wherein the electrolyzing of the metal is performed for 180 to 1800 seconds at a temperature of 5 to 60° C.

5. The method of claim 2,
wherein the first etching solution contains distilled water and at least one compound selected from the group consisting of oxalic acid, acetic acid, nitric acid, hydrochloric acid, and hydrogen peroxide; and
wherein the second etching solution contains sodium hydrogen carbonate, sodium hydroxide, sodium tetraborate, and distilled water.

6. The method of claim 5, wherein the second etching solution contains 0.5 to 8 parts by weight of sodium hydrogen carbonate, 5 to 20 parts by weight of sodium hydroxide, and 0.5 to 8 parts by weight of sodium tetraborate based on 100 parts by weight of distilled water.

7. The method of claim 5, wherein each of the first etching process and the second etching process is performed for 30 to 300 seconds at a temperature of 30 to 80° C.

8. The method of claim 1, wherein the degreasing of the metal is performed together with ultrasonic treatment and the degreasing solution contains distilled water and one of sodium hydrogen carbonate and sodium hexameta phosphate.

9. The method of claim 1, wherein the metal is one of aluminum, iron, copper, gold, and silver, and the polymer resin includes at least one of polybutylene terephthalate (PBT), polyphenylene sulfide (PPS), polyphthalamides (PPA), polyethylene terephthalate (PET), polycarbonate (PC), polyimide (PI), polyaryletherketone (PAEK), polyether-ether-ketone (PEEK).

10. The method of claim 1, wherein the electrolyte solution contains 0.5 to 5 parts by weight of oxalic acid, 0.1 to 10 parts by weight of compound containing carboxylic acid, and 5 to 50 parts by weight of sulfuric acid based on 100 parts by weight of distilled water.

11. The method of claim 1, wherein the electrolyzing of the metal is performed for 180 to 1800 seconds at a temperature of 5 to 60° C.

12. The method of claim 1,
wherein the first etching solution contains distilled water and at least one compound selected from the group consisting of oxalic acid, acetic acid, nitric acid, hydrochloric acid, and hydrogen peroxide; and
wherein the second etching solution contains sodium hydrogen carbonate, sodium hydroxide, sodium tetraborate, and distilled water.

13. The method of claim 12, wherein the second etching solution contains 0.5 to 8 parts by weight of sodium hydrogen carbonate, 5 to 20 parts by weight of sodium hydroxide, and 0.5 to 8 parts by weight of sodium tetraborate based on 100 parts by weight of distilled water.

14. The method of claim 12, wherein each of the first etching process and the second etching process is performed for 30 to 300 seconds at a temperature of 30 to 80° C.

\* \* \* \* \*